UNITED STATES PATENT OFFICE.

HENRY M. HOWE, OF BEDFORD, NEW YORK, ASSIGNOR TO TAYLOR IRON AND STEEL COMPANY, OF HIGH BRIDGE, NEW JERSEY, A CORPORATION OF NEW JERSEY.

PROCESS OF MAKING MANGANESE STEEL.

954,188. Specification of Letters Patent. Patented Apr. 5, 1910.

No Drawing. Application filed March 26, 1907, Serial No. 364,746. Renewed October 25, 1909. Serial No. 524,536.

*To all whom it may concern:*

Be it known that I, HENRY M. HOWE, a citizen of the United States, residing in Bedford, in the county of Westchester and State of New York, have invented certain new and useful Improvements in Processes of Making Manganese Steel, of which the following is a specification.

The present improvement relates to the manufacture of manganese steel, and particularly to the manufacture of such steel from manganese steel scrap, the object of the invention being to provide an effective method of utilizing the scrap for the manufacture of new manganese steel without material loss of the manganese in such scrap.

One of the difficulties met with in the manufacture of manganese steel, and especially in the manufacture of manganese steel castings, has been to find an effective mode of utilizing the manganese steel scrap, since if this is treated by any of the usual processes most of the manganese is lost. I have, however, discovered that by the particular mode of procedure herein set forth the manganese steel scrap can be used for the manufacture of new manganese steel in an effective and economical manner.

In carrying out this improved process of manufacturing manganese steel I first prepare a bath of molten iron containing a predetermined amount of carbon either in the open hearth furnace or Bessemer converter, which molten iron, after being weighed, is then introduced into an electric heating furnace either of the arc or induction type. Here the molten metal is covered with a layer of extremely basic slag. The use of an electric arc furnace is preferable for the reason that the carbid of calcium from the electrodes prevents the oxidation of the manganese. The bath is then superheated as highly as practicable and at least to about 1600 degrees centigrade, and preferably to or above 1650 degrees centigrade, and the manganese steel scrap is then introduced therein. The scrap used is that left from manganese steel in which there was a large percentage of manganese, such for instance as 11 or 12 per cent. or greater. In other words, the term " manganese steel " or " manganese steel scrap " as used herein means exactly what this term is now generally understood to mean in the metallurgical art, and the term " manganese steel " is not understood to mean a steel having 1 or 2 per cent. of manganese therein. This scrap may be introduced either cold or heated. It is preferably heated, but not sufficiently hot to oxidize any large proportion of its manganese. The bath is charged with the manganese steel scrap in instalments, and before each instalment the temperature of the molten metal is raised well above its melting point, say for instance to 1650 degrees centigrade or more, and a new lot of manganese steel scrap is then introduced, although as the quantity of manganese in the bath rises with each addition it may be necessary to restrict somewhat the temperature to which the superheating is carried, in order to avoid the loss of manganese. This operation should be carried on as rapidly as possible so as to lessen the loss of the manganese and the loss of heat and consumption of electricity. After all the scrap has been introduced, the necessary quantity of eighty per cent. ferromanganese, either cold or heated, or even melted, is introduced, and as soon as this is melted and has united with the molten charge, the whole may be tapped into a casting ladle. Instead of introducing the ferromanganese into the bath, it may be introduced into the casting ladle and the molten metal as above prepared poured upon it.

As an illustration of the mode of procedure and as an example of the quantities of the several materials required, the following is presented: If the quantity of manganese steel scrap is about fifty per cent. of that of the manganese steel or castings to be made, and if the new manganese steel is to contain twelve per cent. of manganese and one and one-quarter per cent. of carbon, then for every hundred pounds of new manganese steel to be made I prepare $42\frac{1}{2}$ pounds of molten iron containing about .60 per cent. of carbon, and to this, when superheated, there is added in successive lots a total of about 50 pounds of manganese steel scrap, and after this is thoroughly melted and superheated a little more than $7\frac{1}{2}$ pounds of eighty per cent. ferromanganese is added. $7\frac{1}{2}$ pounds would just about give the needed carbon and manganese if none were removed by oxidation, but as a small quantity always will be removed it is necessary to use a slight excess over 7½ pounds.

No process now exists of which I am aware by which the manganese of manganese steel scrap is recovered. In fact this scrap would be a very valuable product if it could be utilized without losing its manganese. The difficulty is that the moment the material is melted its manganese oxidizes with the greatest rapidity. The conditions are unlike any other process in iron or steel making with which I am acquainted. Two difficulties have to be overcome. In the first place, the proneness of the manganese to be oxidized and be wasted; and second, the fact that in order to use this scrap in the manufacture of new manganese steel the proportion of scrap which must be used is so very large. To use so large a proportion of this scrap with an unsuperheated bath would make the temperature so low that in the time required to bring the resulting charge up to the proper temperature the manganese would all be lost, and this is what happens. But I avoid this difficulty by great superheating by means of an electric furnace. It is by this furnace that such superheating is most readily had. A second reason why I use the electric furnace is that in it there is less loss than in any other furnace, but even in an electric furnace the oxidation of manganese would be excessive unless my plan of strong superheating and using a highly basic slag is followed.

The slight superheating common in ordinary steel manufacture is not to be confounded with the high superheating called for in my invention. The common superheating permits the addition of small quantities of solid material, say 10 to 15 per cent. to a molten bath without freezing that bath, but my high superheating permits me to charge in one lot a very large percentage of solid manganese steel scrap, because the great excess of heat in the superheated bath will bring the whole up to the pouring temperature in so short a space of time that little oxidation of the manganese can occur.

The object of the basic slag, a slag made as basic as possible, is to prevent the oxidation of the manganese. The more basic the slag the less rapidly will the manganese oxidize.

It is, of course, desirable to so carry out the process that enough manganese would remain from the last instalment of scrap to make any final addition of ferromanganese needless. Thus the use of costly ferromanganese would be avoided.

I claim as my invention:

1. The process of making manganese steel from manganese steel scrap which consists in preparing a superheated bath of molten iron, and then introducing into the bath manganese steel scrap, the bath being maintained in such condition during the melting thereof that it will restrict effectively the loss of the manganese contained in such scrap.

2. The process of making manganese steel from manganese steel scrap which consists in preparing a bath of molten iron, then superheating the bath, and then introducing into the bath preheated manganese steel scrap, the bath being maintained in such condition during the melting thereof that it will restrict effectively the loss of the manganese contained in such scrap.

3. The process of making manganese steel from manganese steel scrap which consists in preparing a bath of molten iron, then superheating the bath, and then introducing into the bath in successive instalments or charges manganese steel scrap, the bath being maintained in such condition during the melting thereof that it will restrict effectively the loss of the manganese contained in such scrap.

4. The process of making manganese steel from manganese steel scrap which consists in preparing a bath of molten iron, then superheating the bath, and then introducing into the bath in successive instalments or charges manganese steel scrap, the bath being maintained in such condition during the melting thereof that it will restrict effectively the loss of the manganese contained in such scrap, the temperature of the bath being raised before the introduction of each such instalment.

5. The process of making manganese steel from manganese steel scrap which consists in preparing a bath of molten iron, then superheating the bath, then introducing into the bath in successive instalments or charges manganese steel scrap, the bath being maintained in such condition during the melting thereof that it will restrict effectively the loss of the manganese contained in such scrap, the temperature of the bath being raised before the introduction of each such instalment, and then introducing the desired quantity of ferromanganese.

6. The process of making manganese steel from manganese steel scrap which consists in preparing a bath of molten iron, then superheating the bath, and then introducing into the bath in successive instalments or charges preheated manganese steel scrap, the bath being maintained in such condition during the melting thereof that it will restrict effectively the loss of the manganese contained in such scrap, the temperature of the bath being raised before the introduction of each such instalment of scrap.

7. The process of making manganese steel from manganese steel scrap which consists in preparing a bath of molten iron covered with a layer of extremely basic slag, then superheating the bath, and then introducing into the bath manganese steel scrap, the bath being maintained in such condition during the melting thereof that it will restrict effectively the loss of the manganese contained in such scrap.

8. The process of making manganese steel from manganese steel scrap which consists in preparing a bath of molten iron containing a predetermined amount of carbon and covered with a layer of extremely basic slag, then superheating the bath, then introducing into the bath preheated manganese steel scrap, the bath being maintained in such condition during the melting thereof that it will restrict effectively the loss of the manganese contained in such scrap, the temperature of the bath being raised before the introduction of such scrap well above the melting point of the steel, and then introducing the desired quantity of ferromanganese.

9. The process of making manganese steel from manganese steel scrap which consists in preparing a bath of molten iron containing a predetermined amount of carbon and covered with a layer of extremely basic slag, then superheating the bath, and then introducing into the bath in successive instalments or charges manganese steel scrap, the bath being maintained in such condition during the melting thereof that it will restrict effectively the loss of the manganese contained in such scrap, the temperature of the bath being raised before the introduction of each such instalment of scrap well above the melting point of the bath.

10. The process of making manganese steel from manganese steel scrap which consists in preparing a bath of molten iron, then transferring the molten metal to an electric heating furnace, then superheating the bath, and then introducing into the bath manganese steel scrap, the bath being maintained in such condition during the melting thereof that it will restrict effectively the loss of the manganese contained in such scrap.

11. The process of making manganese steel from manganese steel scrap which consists in preparing a bath of molten iron in an open hearth furnace or Bessemer converter, then transferring the molten metal to an electric heating furnace, then superheating the bath, then introducing into the bath preheated manganese steel scrap, the bath being maintained in such condition during the melting thereof that it will restrict effectively the loss of the manganese contained in such scrap, and then introducing the desired quantity of ferromanganese.

12. The process of making manganese steel from manganese steel scrap which consists in preparing a bath of molten iron in an open hearth furnace or Bessemer converter, then transferring the molten metal to an electric heating furnace, then superheating the bath, and then introducing into the bath in successive instalments or charges manganese steel scrap, the bath being maintained in such condition during the melting thereof that it will restrict effectively the loss of the manganese contained in such scrap, the temperature of the bath being raised before the introduction of each such instalment of scrap.

13. The process of making manganese steel from manganese steel scrap which consists in preparing a bath of molten iron in an open hearth furnace or Bessemer converter, then transferring the molten metal to an electric heating furnace, then superheating the bath, then introducing into the bath in successive instalments or charges manganese steel scrap, the bath being maintained in such condition during the melting thereof that it will restrict effectively the loss of the manganese contained in such scrap, the temperature of the bath being raised before the introduction of each such instalment of scrap well above the melting point of the bath, and then introducing the desired quantity of ferromanganese.

14. The process of making manganese steel from manganese steel scrap which consists in preparing a bath of molten iron in an open hearth furnace or Bessemer converter, then weighing the molten metal, then transferring the molten metal to an electric heating and melting furnace, then superheating the bath, then introducing into the bath in successive instalments or charges preheated manganese steel scrap, the bath being maintained in such condition during the melting thereof that it will restrict effectively the loss of the manganese contained in such scrap, the temperature of the bath being raised before the introduction of each such instalment of scrap well above the melting point of the bath, and then tapping the molten metal into a casting ladle into which ferromanganese has been introduced.

15. The process of making manganese steel having about 12 per cent. of manganese therein from manganese steel scrap which consists, for every 100 pounds of new manganese steel to be made, in preparing a bath of 42½ pounds of molten iron, then superheating the bath, then adding about 50 pounds of manganese steel scrap, the bath being maintained in such condition during the melting thereof that it will restrict effectively the loss of the manganese contained in such scrap, and then when melted adding slightly in excess of 7½ pounds of 80 per cent. ferromanganese.

16. The process of making manganese steel having about 12 per cent. of manganese therein from manganese steel scrap which consists, for every 100 pounds of new manganese steel to be made, in preparing a bath of 42½ pounds of molten iron containing .60 per cent. of carbon, then superheating the bath, then adding in successive lots about 50 pounds of manganese steel scrap, the bath being maintained in such condition during the melting thereof that it will restrict effectively the loss of the manganese contained in such scrap, and then when melted adding slightly in excess of 7½ pounds of 80 per cent. ferromanganese.

17. The process of making manganese steel having about 12 per cent. of manganese therein from manganese steel scrap which consists, for every 100 pounds of new manganese steel to be made, in preparing a bath of 42½ pounds of molten iron containing .60 per cent. of carbon, then superheating the bath, then adding in successive lots about 50 pounds of preheated manganese steel scrap, the bath being maintained in such condition during the melting thereof that it will restrict effectively the loss of the manganese contained in such scrap, the temperature of the bath being raised well above the melting point of the bath before the introduction of each such instalment of scrap, and then when melted adding slightly in excess of 7½ pounds of 80 per cent. ferromanganese.

HENRY M. HOWE.

Witnesses:
EMMA F. CONNOLLY,
C. I. CRANE.